(12) United States Patent
Park (10) Patent No.: US 11,354,028 B2
(45) Date of Patent: Jun. 7, 2022

(54) MULTI-DEPTH IMAGE GENERATION AND VIEWING

(71) Applicant: PJ FACTORY CO., LTD., Seoul (KR)

(72) Inventor: Jung Hwan Park, Seoul (KR)

(73) Assignee: PJ FACTORY CO., LTD., Seoul (KR)

( * ) Notice: Subject to any disclaimer, the term of this patent is extended or adjusted under 35 U.S.C. 154(b) by 0 days.

(21) Appl. No.: 17/418,400

(22) PCT Filed: Dec. 16, 2019

(86) PCT No.: PCT/KR2019/017773
§ 371 (c)(1),
(2) Date: Jun. 25, 2021

(87) PCT Pub. No.: WO2020/138801
PCT Pub. Date: Jul. 2, 2020

(65) Prior Publication Data
US 2022/0066627 A1 Mar. 3, 2022

(30) Foreign Application Priority Data
Dec. 26, 2018 (KR) ........................ 10-2018-0169483

(51) Int. Cl.
*G06F 3/04845* (2022.01)
*G06F 3/04842* (2022.01)
(Continued)

(52) U.S. Cl.
CPC ...... *G06F 3/04845* (2013.01); *G06F 3/04842* (2013.01); *G06T 17/005* (2013.01);
(Continued)

(58) Field of Classification Search
CPC ............. G06F 3/04845; G06F 3/04842; G06F 3/04883; G06F 2203/04804; G06T 17/005; G06T 2200/24
See application file for complete search history.

(56) References Cited

U.S. PATENT DOCUMENTS 6,362,839 B1 * 3/2002 Hamilton .............. G06F 3/0481
345/418
8,271,907 B2 9/2012 Kim et al.
10,061,493 B2 * 8/2018 Park .................... G06F 3/04817
(Continued)

FOREIGN PATENT DOCUMENTS

JP          5723454 B2    5/2015
KR    10-0900295 B1    5/2009
(Continued)

OTHER PUBLICATIONS

International Search Report for PCT/KR2019/017773, dated Mar. 26, 2020.

*Primary Examiner* — Shen Shiau
(74) *Attorney, Agent, or Firm* — Sughrue Mion, PLLC (57) ABSTRACT

A method for configuring a plurality of objects in a multi-depth tree structure is disclosed. The method comprises: upon receiving a first user command including a node attribute for connecting a first object and a second object and a coordinate attribute for representing a position in the first object, associating the second object with the first object in a first mode; upon receiving a second user command including the node attribute without the coordinate attribute in the first object, associating the second object with the first object in a second mode. In the first mode the second object is inserted at the position indicated by the coordinate attribute within the first object, and in the second mode the second object is inserted into the first object with specifying no position within the first object.

17 Claims, 8 Drawing Sheets

(51) Int. Cl.
*G06T 17/00* (2006.01)
*G06F 3/04883* (2022.01)

(52) U.S. Cl.
CPC .................. *G06F 3/04883* (2013.01); *G06F 2203/04804* (2013.01); *G06T 2200/24* (2013.01)

(56) References Cited

U.S. PATENT DOCUMENTS

| | | | | |
|---|---|---|---|---|
| 10,824,313 | B2* | 11/2020 | Park | G06F 3/0486 |
| 2001/0041618 | A1* | 11/2001 | Ouchi | G06T 15/205 |
| | | | | 463/43 |
| 2004/0075663 | A1* | 4/2004 | Plante | H04N 5/272 |
| | | | | 345/474 |
| 2011/0268369 | A1* | 11/2011 | Richards | G06K 9/60 |
| | | | | 382/284 |
| 2011/0270586 | A1* | 11/2011 | Diguet | G06T 19/20 |
| | | | | 703/1 |
| 2014/0258903 | A1 | 9/2014 | Kanbara et al. | |
| 2016/0117085 | A1* | 4/2016 | Park | G06F 3/04817 |
| | | | | 715/771 |
| 2018/0188926 | A1* | 7/2018 | Park | G06F 3/0482 |
| 2018/0276867 | A1 | 9/2018 | Breckenridge et al. | |
| 2019/0079654 | A1 | 3/2019 | Moon et al. | |
| 2020/0026806 | A1* | 1/2020 | Ullom | G06T 15/005 |
| 2020/0327366 | A1* | 10/2020 | Park | G06K 9/6219 |
| 2020/0341608 | A1* | 10/2020 | Park | G06F 3/04842 |
| 2021/0352268 | A1* | 11/2021 | Park | G06F 16/53 |

FOREIGN PATENT DOCUMENTS

| | | |
|---|---|---|
| KR | 10-1501028 B1 | 3/2015 |
| KR | 10-2017-0069696 A | 6/2017 |

* cited by examiner

MULTI-DEPTH IMAGE GENERATION AND VIEWING

CROSS REFERENCE TO RELATED APPLICATIONS

This application is a National Stage of International Application No. PCT/KR2019/017773 filed Dec. 16, 2019, claiming priority based on Korean Patent Application No. 10-2018-0169483 filed Dec. 26, 2018, which is incorporated herein by reference in their entirety.

TECHNICAL FIELD

The present invention relates to a method of generating a multi-depth image of a tree structure and viewing the generated multi-depth image.

BACKGROUND ART

The statements in this section merely provide background information related to the present disclosure and do not necessarily constitute prior art.

With the development of information communication and semiconductor technology, users may access various contents or store and use various contents in their electronic devices (e.g., smartphones or PCs) through the Internet. While the amount of content is vast, it is difficult to easily find and check contents that are highly related to each other because a vast amount of content is scattered sporadically.

As an example, when an image file is opened using an electronic device, detailed information on a specific part of the image file or an enlarged image may be requested. For example, in the case of a vehicle image, a more detailed image of a specific part, such as a headlight or a wheel, may be required. In this case, there is a hassle for the user to find new related images.

In order to solve this problem, the present applicant registered, as Korean Patent No. 10-1501028 (registered on Mar. 4, 2015), the invention that relates to an image of a new format (hereinafter referred to as 'multi-depth image') that allows the insertion of another image (hereinafter referred to as 'insert image') that provides additional information to one basic image (hereinafter, referred to as 'main image'), and a generation method thereof.

The document discloses a user interface for defining a multi-depth image and generating and editing a multi-depth image. The present invention is a follow-on invention of the same invention, and provides a method of generating a multi-depth image in various ways according to properties of images or objects and the relationship between the objects, and furthermore providing a more intuitive way for users to view each image in a multi-depth image.

SUMMARY

Technical Problem

The present invention is to provide a method capable of generating a multi-depth image in various ways according to the relationship between objects.

The present invention is also to provide a method for a user to more intuitively view the generated multi-depth image.

Technical Solution

According to at least one aspect, the present disclosure provides a method, performed by an electronic device, for configuring a plurality of objects in a multi-depth tree structure. The method comprises, upon receiving a first user command including a node attribute for connecting a first object and a second object and a coordinate attribute for representing a position in the first object, associating the second object with the first object in a first mode. The first object may be a two-dimensional or three-dimensional image. The method further comprises, upon receiving a second user command including the node attribute without the coordinate attribute in the first object, associating the second object with the first object in a second mode. In the first mode the second object is inserted at the position indicated by the coordinate attribute within the first object, and in the second mode the second object is inserted into the first object with specifying no position within the first object.

According to at least one aspect, the present disclosure provides A computer-readable program that: upon receiving a first user command including a node attribute for connecting a first object and a second object and a coordinate attribute for representing a position in the first object, executes associating the second object with the first object in a first mode, wherein the first object is an image; and upon receiving a second user command including the node attribute without the coordinate attribute in the first object, executes associating the second object with the first object in a second mode. In the first mode the second object is inserted at a position indicated by the coordinate attribute within the first object, and in the second mode the second object is inserted into the first object with specifying no position within the first object.

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination thereof.

Hereinafter, some embodiments of the present disclosure will be detailed with reference to the accompanying drawings.

A multi-depth image refers to an image in which a plurality of images is formed in a tree structure by hierarchically repeating the process of inserting another image into one image.

Figure 1:
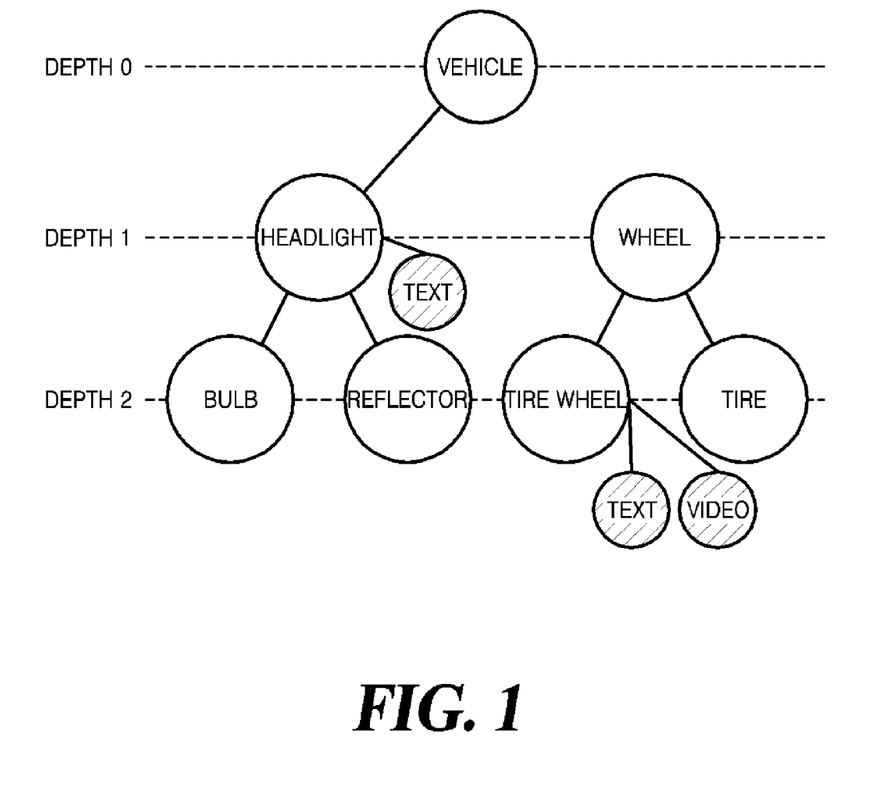
FIG. 1 is an exemplary diagram showing a tree structure of a multi-depth image according to the present embodiment.

FIG. 1 is an exemplary diagram showing a tree structure of a multi-depth image according to the present invention.

Referring to FIG. 1, a multi-depth image may be configured as one main image and a plurality of sub images. A plurality of images of a multi-depth image may be hierarchized considering a specific subject or context, and then configure nodes to form a single tree structure. In this case, the main image forms a root node of a tree structure, and the sub images form lower nodes.

FIG. 1 shows an exemplary tree structure of a multi-depth image based on a vehicle. The main image representing the vehicle's overall appearance corresponds to the root node (depth 0). Images of headlights and wheels, which are components of the vehicle, are inserted as sub images into the main image to configure nodes of depth 1. The images of the bulb and the reflector, which are components of the headlight, are inserted as sub images into the headlight image to configure nodes of depth 2. In addition, images of tires and tire wheels, which are components of the wheel, are inserted as sub images into the wheel image to configure nodes of depth 2. As a result, the headlight node and the wheel node are located under the vehicle node, the bulb node and the reflector node are located under the headlight node, and the tire node and the tire wheel node are located under the wheel node. Then, in this way, in the present embodiment, a plurality of sub images are connected to each other in a tree structure, so that the image of the child node is inserted into the image of the parent node.

The multi-depth image is an image format in which an object of a child node is inserted into an object of a parent node in a tree structure as illustrated in FIG. 1. When an object of a child node is inserted into an object of a parent node, the inserted object is generally an image, and the image may be two-dimensional or three-dimensional. However, in addition to the image, video, text, audio, links to other files, Internet address links, bookmarks, 360 images, and various objects such as 3D objects may be inserted into the object of the parent node as the object of the child node. Hereinafter, the present embodiment will be described on the premise that all objects inserted into each node of the multi-depth image are images. However, it should be noted that this is for convenience of description and does not limit the present invention.

Moreover, in the tree structure of the multi-depth image, multimedia content may be additionally mapped to each node. Here, the multimedia content is digital content related to an image inserted in each node, and may include various types of objects such as text, video, and audio. For example, in the tree structure of FIG. 1, text indicating specification information such as manufacturer, luminance, and lifetime may be mapped to a headlight node. Text representing specification information such as material and manufacturing method may be mapped to the tire wheel node. In addition, video indicating the shape of the tire wheel during vehicle driving may be additionally mapped to the tire wheel node.

The present disclosure includes two modes as a method of generating a multi-depth image.

The first mode is a mode in which a child node image is inserted at a specific position in the parent node image. For this, attribute information including a node attribute indicating the connection relationship between the parent node image and the child node image, and a coordinate attribute indicating the position where the child node image is inserted in the parent node image is defined. The attribute information is stored together with the image of the parent node and the image of the child node.

Figure 2:
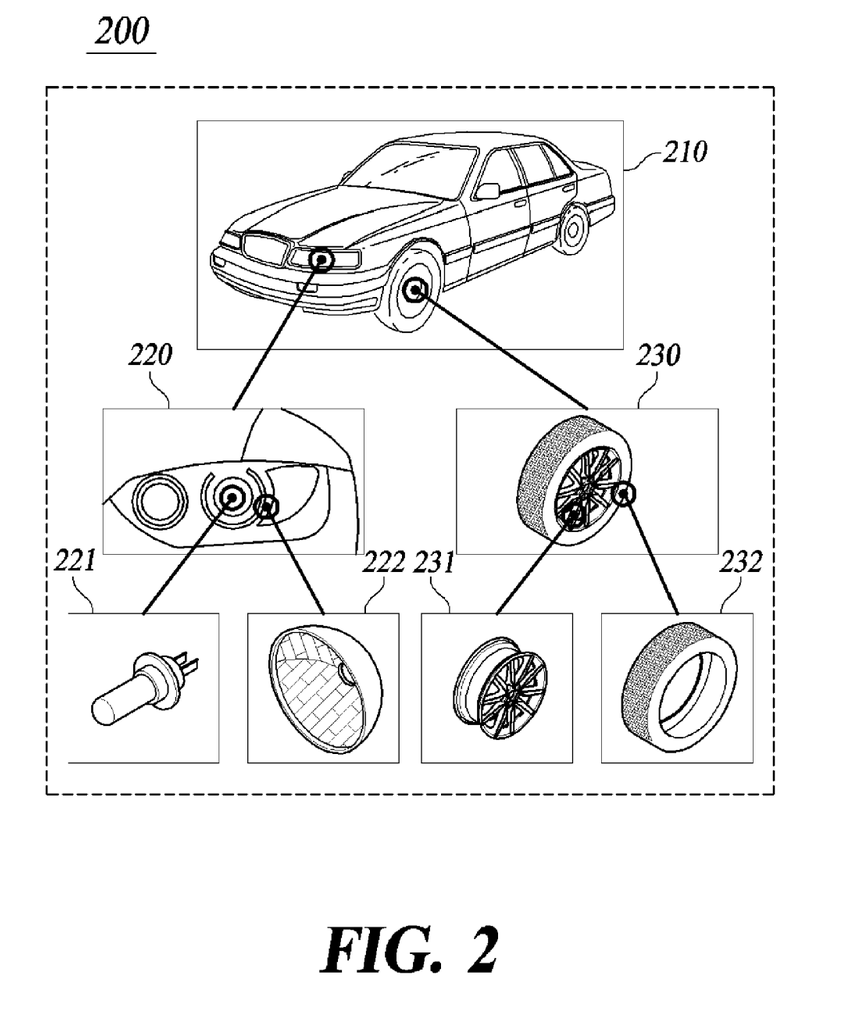
FIG. 2 is an exemplary diagram showing a process of inserting an image in a tree structure in a first mode according to the present embodiment.

FIG. 2 is an exemplary diagram illustrating a process of inserting an image in a first mode.

Referring to FIG. 2, the multi-depth image 200 for the vehicle may include an entire vehicle image 210, a headlight image 220, a bulb image 221, a reflector image 222, a wheel image 230, a tire wheel image, and a tire image 232.

The user may insert the headlight image 220 (a detail image of the headlight) at the position of the headlight in the vehicle image 210 displayed on the display unit of the electronic device. For example, the user may select the headlight image 220 by touching or clicking, and drag the selected headlight image 220 to the position to be inserted in the vehicle image 210 to insert the headlight image at the corresponding position. When the headlight image is inserted, a first marker (e.g., '⊙' in FIG. 2) is displayed on the vehicle image 210 to indicate that another image is inserted at the position of the headlight. The user may select the first marker ⊙ displayed on the vehicle image 210 and view the headlight image 220 inserted at the position through the display unit of the electronic device.

Meanwhile, while the headlight image 220 is displayed on the display unit, the user may insert the detail image 221 of the bulb at the bulb position of the headlight image 220. A first marker '⊙' for indicating that the image is inserted is displayed in the headlight image 220 at the position where the detail image 221 for the bulb is inserted.

In this way, the electronic device may generate a multi-depth image in the form of a tree structure by inserting a child node image at a specific position of the parent node image according to a user's manipulation, and display the image of the child node inserted at the position marked with the marker when an input of clicking or touching a marker ⊙ displayed in the parent node image is received.

The first mode described above is useful when defining an insertion relationship between two images in a dependency relationship, such as a vehicle and a headlight, or two images in a relationship between a higher-level concept and a lower-level concept. However, this dependency relationship may not be established between two images. For example, for two images that are related by an equal relationship rather than a dependency relationship, such as photos showing changes over time, before/after comparison photos, and inside/outside comparison photos, it is not natural to insert one image at a specific position in another image. For example, if the headlight image 220 in FIG. 2 is a photo with the headlight off, the user may try to further associate the photo with the headlights on with the photo with the headlights off. It is unnatural to insert a photo with the headlight on at a specific position in the image with the headlight off.

Figure 3:
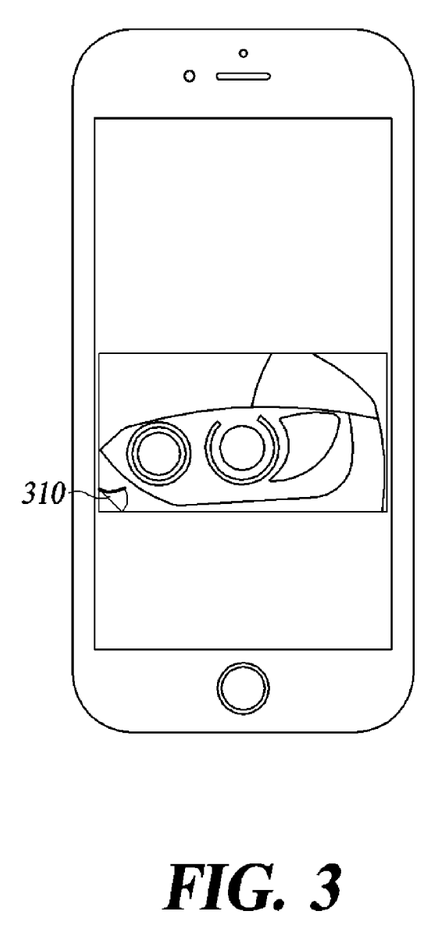
FIG. 3 is an exemplary diagram illustrating a case where an image is inserted in a second mode according to the present embodiment.

The second mode, which is another mode described in the present disclosure, is a mode in which a child node image is inserted into a parent node image without designating a specific position in the parent node image. That is, the child node image is inserted into the parent node image in the same relationship as the parent node image. In the second mode, only a node attribute indicating a connection relationship between a parent node image and a child node image is defined, and a coordinate attribute indicating a position where the child node image is inserted in the parent node image is not defined. Node attributes are stored together with the image of the parent node and the image of the child node. A second marker indicating that the object has been inserted in the second mode is displayed on the image of the parent node. The second marker may be displayed on the edge of the first object so as not to interfere with inserting the object in the first mode at a specific position in the parent node image. For example, as shown in FIG. 3, the second marker may be a marker 310 that a page is folded at one edge of the parent node image.

The method of configuring a multi-depth image using the first mode and the second mode described above may be implemented as a program and executed by an electronic device capable of reading the program. The electronic device executes the program and inserts an image in the first mode in some nodes and the image in the second mode in other nodes to generate a multi-depth image in a tree structure. A plurality of images may be inserted into one image corresponding to one node by using the first mode and the second mode. A plurality of images hierarchically inserted in at least one or more of the first mode or the second mode are generated as a single file together with attribute information defining a relationship between the images, so that a multi-depth image consisting of a tree structure is generated. Attribute information defining between a parent node and a child node associated in the first mode includes a node attribute defining a parent node and a child node, and a coordinate attribute indicating a specific position in the parent node image. On the other hand, attribute information defining between a parent node and a child node associated in the second mode includes only the node attribute without the coordinate attribute.

Figure 4:
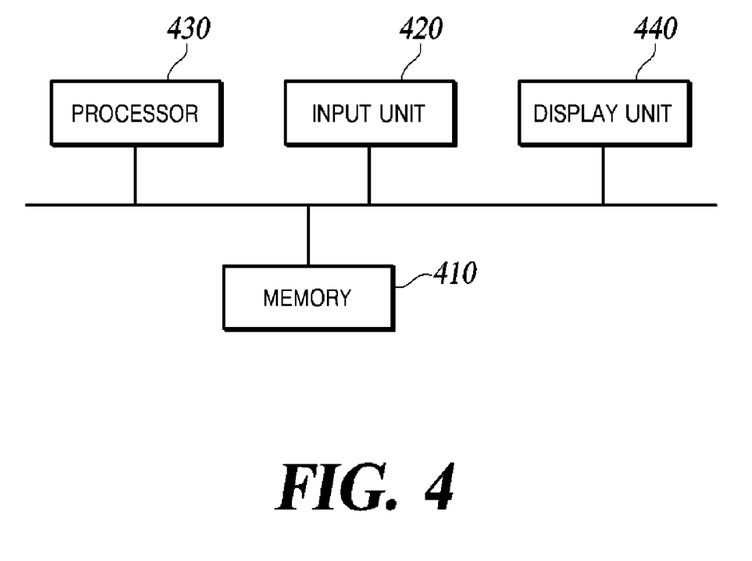
FIG. 4 is an exemplary block diagram of an electronic device for implementing the present embodiment.

FIG. 4 is an exemplary diagram of an electronic device for implementing the technology of the present disclosure.

The electronic device may include a memory 410, an input unit 420, a processor 430, and a display unit 440.

The memory 410 stores a program for generating or viewing a multi-depth image in a first mode and a second mode. The input unit 420 may be a keypad, a mouse, or the like as a means for receiving a user's command, or may be a touch screen integrated with the display unit 440. The processor 430 receives a user command input from the input unit 420 and reads the execution codes of the program stored in the memory 410 to execute a function of generating or viewing a multi-depth image. The display unit 440 displays the execution result by the processor 430 so that the user may check it. Alternatively, when the input unit 430 is implemented as a touch screen, the display unit 440 may display a soft button for inputting a user command.

Figure 5:
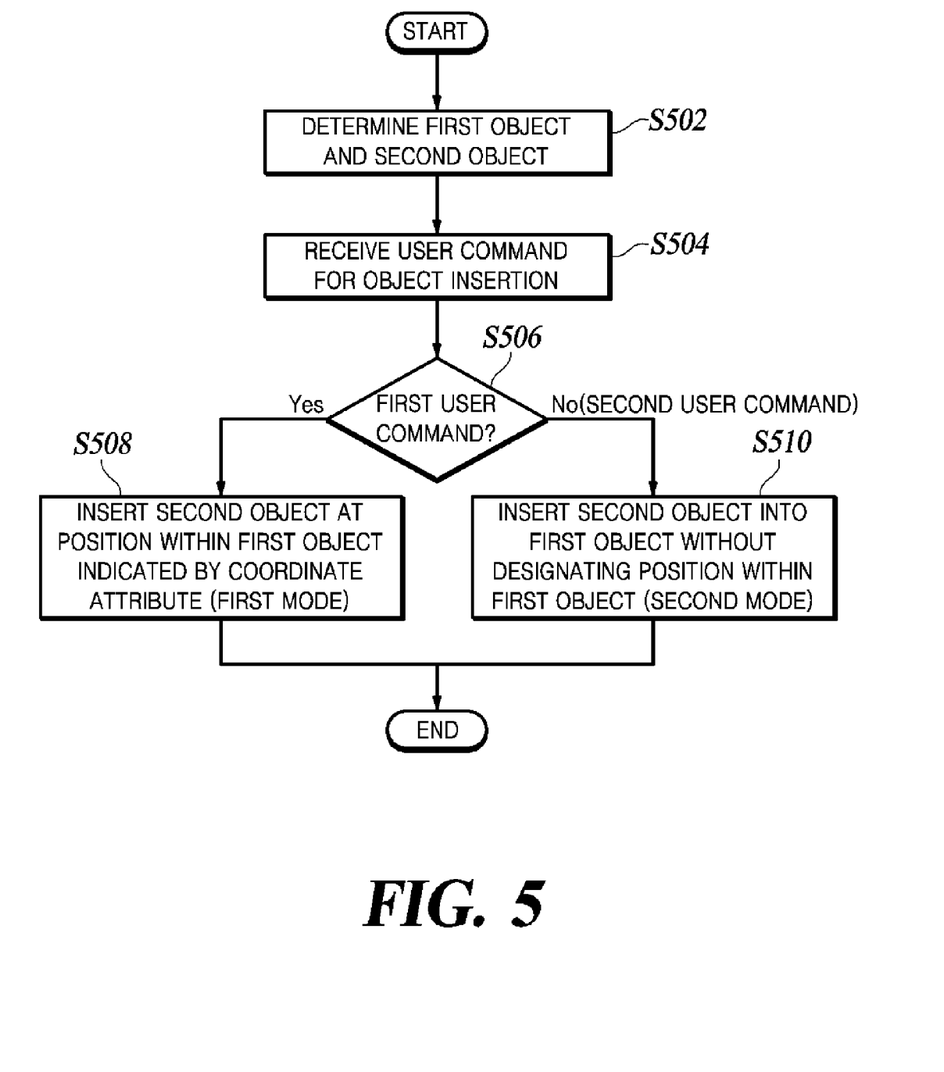
FIG. 5 is a flowchart for explaining the operation of an electronic device according to the present embodiment.

With reference to FIG. 5, the operation of the processor will be described when the above program is executed. The processor 430 determines a first object corresponding to a parent node and a second object corresponding to a child node according to a user manipulation input through the input unit 420 (S502). Here, the first object is a two-dimensional or three-dimensional image having coordinate information. The second object may be an image or multimedia data such as audio or video. The user may select the first object and the second object respectively corresponding to the parent node and the child node, by using images stored in the memory 410 of the electronic device or photos taken with a camera provided in the electronic device. As an example, a user may stack objects in layers by manipulating the input unit. The processor 430 may determine an object of a higher layer as a child node and an object of a layer immediately below the higher layer as a parent node. The lowest layer may be used as the main image corresponding to the root node.

When receiving a user command for inserting the second object into the first object (S504), the processor 430 determines whether the user command is a first user command including a node attribute connecting the first object and the second object and a coordinate attribute indicating a position in the first object, or whether the user command is a second user command including a node attribute without a coordinate attribute (S506).

If the received command is the first user command, the processor 430 executes the first mode (S508). That is, the second object is inserted at the position indicated by the coordinate attribute within the first object. The first user command is generated from a user manipulation of assigning a specific position within the first object. For example, when a user drags the second object and assigns the second object at a specific position within the first object displayed on the display unit 440, the processor 430 inserts the second object at the specific position within the first object. It is described in more detail with reference to FIG. 6. After the first object A and the second object B are selected by the user, in a state in which the second object B is displayed on the screen, when the user presses the second object B for more than a certain period of time ((a) of FIG. 6), the second object B becomes a pointer or an icon and the first object A is displayed on the screen ((b) of FIG. 6). The user may select a position to insert the second object B while moving the second object B that becomes the pointer on the first object A. According to a user manipulation of moving the second object B, the processor 430 moves the first object A in a direction opposite to the moving direction of the second object B. Referring to (c) of FIG. 6, in response to the manipulation of the user moving the second object B in the upper left direction, the processor 430 moves the first object A in the lower right direction. This allows rapid movement of the second object B on the first object A. In addition, this makes it possible to position the second object B on the edge of the first object A, and accordingly it is easy to insert the second object B near or at the edge of the first object A. When the user assigns the second object B to the specific position in the first object A, the processor 430 inserts the second object B at the specific position ((b) of FIG. 6).

When the second object is inserted at the specific position of the first object by the first mode, the processor 430 stores in the memory 410 a node attribute defining a node connection relationship between the first object and the second object and a coordinate attribute indicating the specific position within the first object, together with the first object and the second object. In order to allow the user to identify that another object is inserted, a first marker (e.g., '⊙' in FIG. 2) is displayed at the position where the second object is inserted in the first object. When the user selects the first marker on the first object displayed on the display unit 440, the processor 430 displays the second object inserted at the position of the first marker on the display unit 440.

Figure 6:
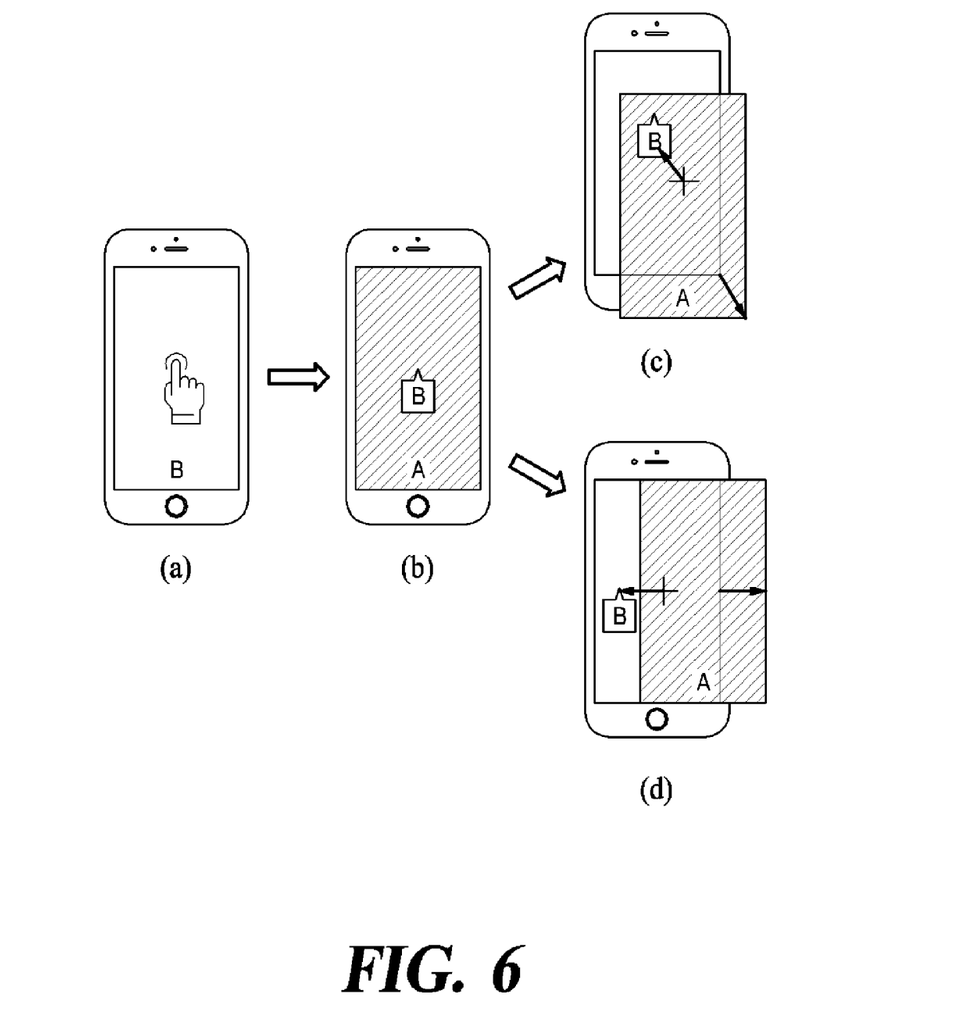
FIG. 6 is an exemplary diagram for explaining generation of a multi-depth image according to user manipulation according to the present embodiment.

Meanwhile, if the received command is the second user command, the processor 430 executes the second mode (S510). That is, the second object is inserted into the first object without designating a position within the first object. The second user command is generated from a user manipulation that does not assign a position within the first object. For example, the second user command may be generated from a user manipulation of allocating the second object to an external area of the first object displayed on the display unit 440. Referring to FIG. 6, a user drags the second object B to position the second object in an external area of the first object. When the second object is allocated to the external area of the first object, the processor 430 generates the second user command, and accordingly inserts the second object into the first object in the second mode without designating a specific position in the first object according to the second user command. Alternatively, the second user command may be generated through a manipulation of pressing a button assigned to the second mode as a physical button provided in the electronic device. Alternatively, the second user command may be generated by a user manipulation of selecting a soft button or area displayed on the display unit 440 of the electronic device. The soft button or area may be displayed outside the first object or inside the first object. When implemented to be displayed inside the first object, a user manipulation of selecting the soft button or area should not allocate the coordinate attribute of the first object.

The node attribute included in the second user command is stored in the memory 410 together with the first object and the second object. A second marker (e.g., 310 of FIG. 3) indicating that the second object is inserted in the second mode may be displayed on one edge of the first object. When the user selects the second marker on the first object displayed on the display unit 440, the processor 430 displays the second object on the display unit 440.

A plurality of second objects to be inserted into the first object in the second mode may be selected. For example, if a user inputs a second user command for collectively inserting the selected second objects into the first object in a second mode after selecting the plurality of second objects in the order of object A, object B, object C, and object D, the processor 430 sequentially and hierarchically inserts the second objects in the second mode. Here, the sequential/hierarchical insertion in the second mode means that each object is inserted into the immediately preceding object in the second mode in the order of the first object, object A, object B, object C, and object D. That is, object A among the second objects is inserted into the first object in the second mode, B object among the second objects is inserted into object A in the second mode, and object C is inserted into object B in the second mode. And, object D is inserted into object C in the second mode.

Meanwhile, the program stored in the memory 410 includes a user intuitive function for displaying the second object inserted in the first object in the second mode to the user. As described above, the second mode is particularly useful in the case of association between photos representing changes over time, before/after comparison photos, and internal/external comparison photos. Accordingly, the present embodiment provides a viewing function in which the first object and the second object can be viewed while comparing each other.

Any one of the first object and the second object related in the second mode is displayed on the display unit 440. When the user inputs a gesture with directionality in this state, the processor 440 displays the first object and the second object with transition between them according to the direction and movement length of the input gesture. The transition between the first object and the second object is gradually performed according to the movement length of the gesture. In other words, the degree of transition between the first object and the second object is different according to the movement length of the gesture.

There may be various methods of inputting a gesture having directionality. When a gesture of moving a touch from left to right is input while the first object is displayed, the first object displayed on the display unit gradually transitions to the second object. When a gesture of moving a touch from right to left is input while the second object is displayed, the second object displayed on the display unit gradually transitions to the first object. Alternatively, a gesture having directionality may be input in proportion to the time or number of times the soft button or the physical button of the electronic device is pressed. For example, the direction of the gesture may be determined according to the type of the direction key, and the movement length of the gesture may be determined according to the time during which the direction key is continuously pressed. When the user presses the "→" arrow key while the first object is displayed, the first object displayed on the display unit 440 may gradually transition to the second object in proportion to the time during which the "→" direction key is continuously pressed.

Figure 7:
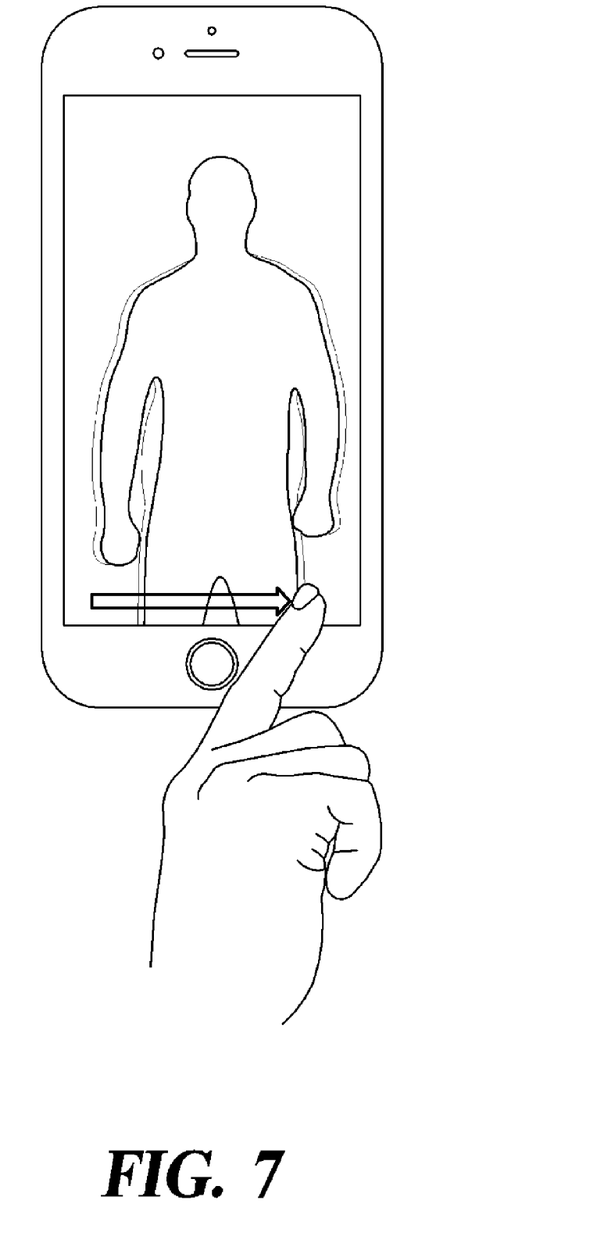
FIG. 7 is an exemplary diagram for transition between objects in a multi-depth image according to the present embodiment.

The degree of transition may be transparency. Referring to FIG. 7, the processor 430 may gradually adjust the transparency of the first object and the second object according to the movement length of the gesture, and display the first object and the second object on the display unit 440 by overlapping the first object and the second object. When the gesture input is stopped (for example, touch release), an object having low transparency is selected from among the first object and the second object overlapped and displayed on the display unit 440. Alternatively, the first object and the second object may be displayed by overlapping each other with transparency at the time point when the gesture is stopped.

Figure 8:
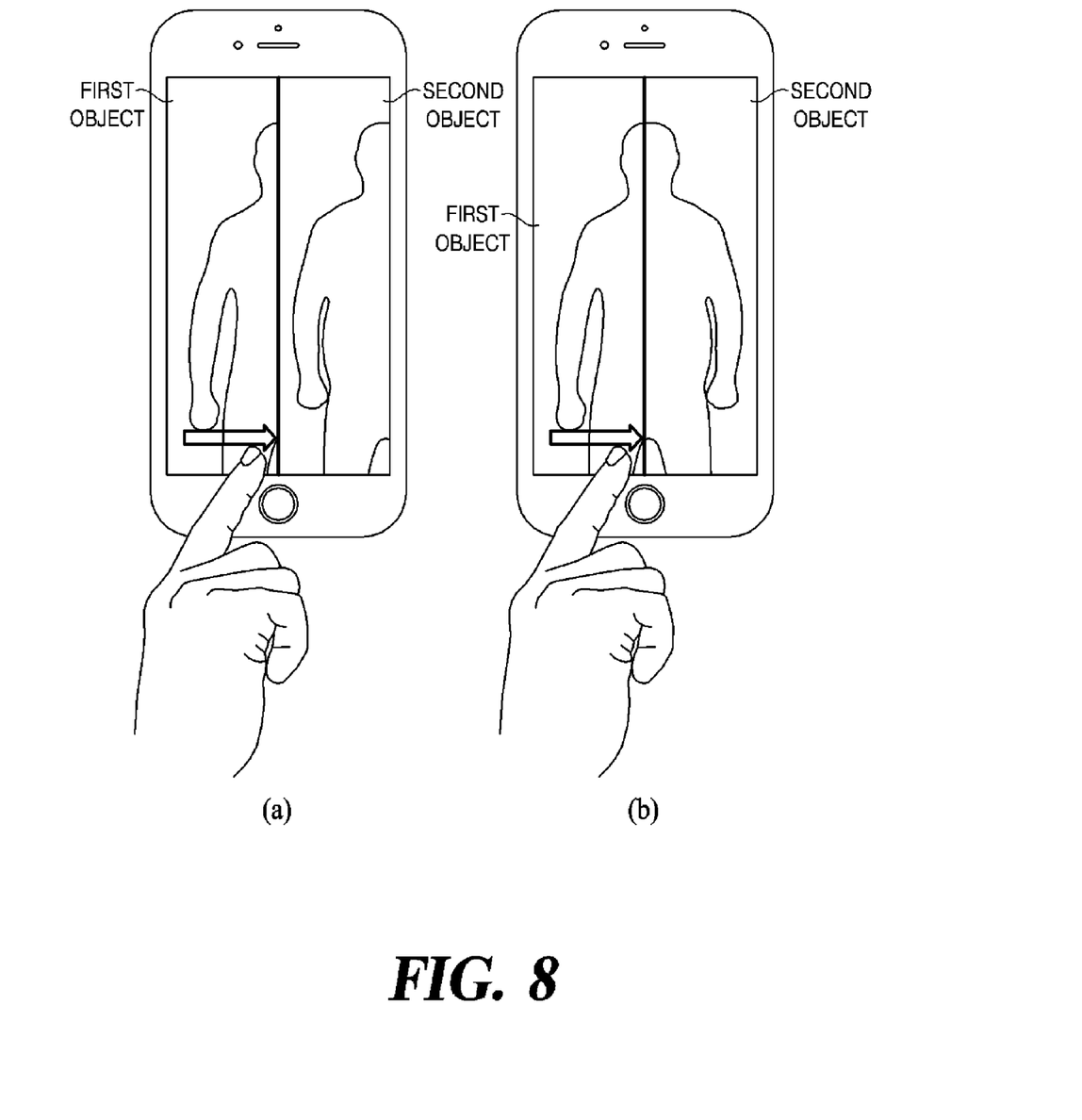
FIG. 8 is another exemplary diagram for transition between objects in a multi-depth image according to the present embodiment.

As another example, the degree of transition may be a ratio in which the second object is displayed on the screen of the display unit 440 relative to the first object. When a gesture is input while the first object is displayed, a partial area of the first object disappears from the screen by a ratio proportional to the movement length of the gesture. In addition, a partial area of the second object corresponding to the ratio is displayed on the area in the screen where the first object has disappeared. For example, referring to (a) of FIG. 8, when the touch is dragged from left to right, the first object is gradually pushed to the right according to the dragging length, and the second object gradually appears in the area of the screen where the first object is pushed. Alternatively, as shown in (b) of FIG. 8, the left part of the first object is folded by a ratio proportional to the length of dragging the touch from left to right, and a partial area to the left of the second object corresponding to the ratio may appear in the area of the screen where the first object is folded.

As an application of the present embodiment, an image group including a plurality of images may be inserted into the first object as a second object. The fore-mentioned example of selecting a plurality of second objects and inserting the plurality of second objects into the first object in a second mode sequentially/hierarchically is a case where the selected objects are respectively recognized as separated objects. That is, the example is to insert the plurality of objects into the first object in the second mode at once. On the other hand, in the application of this embodiment described herein, the image group including the plurality of images is treated as a single object. This corresponds to a group of images taken at regular time intervals, such as photos or videos taken in continuous mode. Also, a case where a user selects a plurality of images and then combines them into a single image group and sets them as a single object also corresponds to the application of the present embodiment.

When the second object is an image group including the plurality of images, as an example, the second object may be inserted into the first object in the first mode. If the first user command is input in a manner that the user selects a second object and assigns the selected second object to a specific position within the first object displayed on the display unit 440, the processor 430 inserts one image (e.g., the first image) among a plurality of images included in the second object into a specific position of the first object. Then, the remaining images of the plurality of images are inserted into the one image (the first image) in the second mode.

Since the second object is inserted at the specific position of the first object, the first marker (e.g., '◎' in FIG. 2) is displayed at the specific position of the first object. When the user selects the first marker, the processor 430 displays the first image of the second object inserted at the specific position of the first object on the display unit 440. Since the remaining images among the plurality of images are inserted into the first image displayed on the display unit 440 in the second mode, the second marker (e.g., 310 in FIG. 2) is displayed on one edge of the first image. When the user selects the second marker, the processor 430 plays the plurality of images. That is, the processor 430 plays the plurality of images by sequentially displaying the remaining images among the plurality of images on the display unit 440.

As another example, a second object, which is an image group including the plurality of images, may be inserted into the first object in the second mode. The user inputs the second user command for inserting the second object into the first object in the second mode. For example, as described above, the second user command may be input through a method in which the user allocates the second object to an external area of the first object. The processor 430 inserts the second object into the first object without designating a specific position within the first object.

Since the second object is inserted into the first object in the second mode, the second marker is displayed on one edge of the first object. When the user selects the second marker, the processor 430 sequentially displays the plurality of images included in the second object on the display unit 440.

Meanwhile, the user may play the second object inserted in the first mode or the second mode in the first object through a gesture input having directionality. In a state where any one of the plurality of images included in the second object is displayed on the display unit 440, when receiving a gesture with directionality from the user, the processor 430 sequentially plays the images in the forward or reverse direction from the currently displayed image according to the direction of the gesture. The speed of play is determined by the speed of the gesture. When the gesture is stopped, the processor 430 displays, on the display unit 440, an image displayed at the time point of stopping the gesture from among the plurality of images. The user may insert another object in the first mode or the second mode in the image displayed at the time point of stopping the gesture. That is, the second object play method through gesture input provides a function of selecting an arbitrary image from among the plurality of images grouped into one image group and inserting another object into the selected image in the first mode or the second mode.

Although exemplary embodiments of the present invention have been described for illustrative purposes, those skilled in the art will appreciate that various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A method, performed by an electronic device, for configuring a plurality of objects in a multi-depth tree structure, the method comprising:
   upon receiving a first user command including a node attribute for connecting a first object and a second object and a coordinate attribute for representing a position in the first object, associating the second object with the first object in a first mode, wherein the first object is a two-dimensional or three-dimensional image; and
   upon receiving a second user command including the node attribute without the coordinate attribute in the first object, associating the second object with the first object in a second mode,
   wherein in the first mode, the second object is inserted at the position indicated by the coordinate attribute within the first object, and
   wherein in the second mode, the second object is inserted into the first object with specifying no position within the first object.

2. The method of claim 1, wherein the first user command is generated from a user manipulation of allocating the second object to a specific position within the first object being displayed on the electronic device, and
   wherein the second user command is generated from a user manipulation of allocating the second object to an area outside the first object being displayed on the electronic device.

3. The method of claim 1, wherein the second user command is generated from a user manipulation related to a soft button or area displayed on a display unit of the electronic device or a physical button provided on the electronic device.

4. The method of claim 1, wherein the electronic device displays, at the position indicated by the coordinate attribute within the first object, a first marker indicating that the second object has been inserted in the first mode, and displays, at an edge of the first object, a second marker indicating that the second object is inserted in the second mode.

5. The method of claim 1, wherein in a state where the second object is inserted into the first object in the second mode, when receiving a gesture with directionality from a user, a transition between the first object and the second object is executed according to a direction of the gesture, and
   wherein a degree of the transition between the first object and the second object is different according to a movement length of the gesture.

6. The method of claim 5, wherein the transition is performed by gradually adjusting a transparency between the first object and the second object overlapping each other according to the movement length of the gesture.

7. The method of claim 6, wherein when the gesture is stopped, an object with low transparency at a time point of stopping among the first object and the second object is displayed.

8. The method of claim 6, wherein when the gesture is stopped, the first object and the second object having transparency at a time point of stopping are overlapped and displayed.

9. The method of claim 1, wherein when the second object is an image group including a plurality of images, upon receiving the first user command, one image of the plurality of images is inserted into the first object in the first mode, and the remaining images among the plurality of images are inserted into the one image in the second mode.

10. The method of claim 9, wherein when a second marker indicating that the remaining images are inserted in the second mode on the one image is selected by a user, images in the image group are sequentially displayed.

11. The method of claim 9, wherein in a state where an arbitrary image among the plurality of images is displayed on a display unit of the electronic device, when a gesture having directionality is received from a user, a direction and speed of sequentially displaying the plurality of images are adjusted according to a direction and speed of the gesture.

12. The method of claim 11, wherein when the gesture is stopped, an image displayed at a stopped time point among the plurality of images is kept.

13. The method of claim 1, wherein when the second object is an image group including a plurality of images, upon receiving the second user command, the image group is inserted into the first object in the second mode.

14. The method of claim 13, wherein when a second marker indicating that the image group is inserted in the second mode in the first object is selected by a user, the plurality of images in the image group are sequentially displayed.

15. The method of claim 13, wherein in a state where an arbitrary image among the plurality of images is displayed on a display unit of the electronic device, when a gesture having directionality is received from a user, a direction and speed of sequentially displaying the plurality of images are adjusted according to a direction and speed of the gesture.

16. The method of claim 15, wherein when the gesture is stopped, an image displayed at a stopped time point among the plurality of images is kept.

17. A non-transitory computer-readable recording medium storing a program including computer-executable instructions for causing, when executed in a processor, to:
upon receiving a first user command including a node attribute for connecting a first object and a second object and a coordinate attribute for representing a position in the first object, associate the second object with the first object in a first mode, wherein the first object is an image; and
upon receiving a second user command including the node attribute without the coordinate attribute in the first object, associate the second object with the first object in a second mode,
wherein in the first mode, the second object is inserted at a position indicated by the coordinate attribute within the first object,
wherein in the second mode, the second object is inserted into the first object with specifying no position within the first object.

* * * * *